United States Patent
Erdener et al.

(10) Patent No.: US 10,139,060 B1
(45) Date of Patent: Nov. 27, 2018

(54) LED LIGHTING METHODS AND APPARATUS

(71) Applicant: Wangs Alliance Corporation, Port Washington, NY (US)

(72) Inventors: Basar Erdener, Millbrook, NY (US); Voravit Puvanakijjakorn, Port Washington, NY (US)

(73) Assignee: WANGS ALLIANCE CORPORATION, Port Washington, NY (US)

( * ) Notice: Subject to any disclaimer, the term of this patent is extended or adjusted under 35 U.S.C. 154(b) by 0 days.

(21) Appl. No.: 15/430,417

(22) Filed: Feb. 10, 2017

Related U.S. Application Data

(60) Provisional application No. 62/294,297, filed on Feb. 11, 2016.

(51) Int. Cl.
*F21S 8/02* (2006.01)
*F21K 9/62* (2016.01)
(Continued)

(52) U.S. Cl.
CPC ............... *F21S 8/026* (2013.01); *F21K 9/62* (2016.08); *F21V 3/0615* (2018.02); *F21V 21/04* (2013.01); *F21V 29/773* (2015.01); *F21V 29/89* (2015.01); *G02B 27/09* (2013.01); *H05B 33/0845* (2013.01); *H05B 33/0857* (2013.01);
(Continued)

(58) Field of Classification Search
CPC . F21S 8/026; F21S 8/033; F21S 13/02; F21K 9/62; F21K 9/68; F21K 9/69; H05B 33/0857; H05B 33/0845; F21Y 2105/18; F21Y 2113/13; F21Y 2113/10; G02B 27/09; G02B 27/0922; F21V 21/04; F21V 29/89; F21V 29/773; F21V 3/0427; F21V 7/0033; F21V 7/0058; F21V 7/0083; F21V 7/0025

See application file for complete search history.

(56) References Cited

U.S. PATENT DOCUMENTS 6,155,693 A * 12/2000 Spiegel .................... F21S 8/033
362/147
6,641,283 B1 * 11/2003 Bohler ...................... F21S 8/00
362/238

(Continued)

*Primary Examiner* — Y M. Lee
(74) *Attorney, Agent, or Firm* — Straub & Straub; Stephen T. Straub; Michael P. Straub

(57) ABSTRACT

The present invention relates to LED related lighting methods and apparatus. An exemplary light assembly in accordance with the invention includes a first reflector, an LED downlight for emitting light in a downward direction through a cavity formed by the first reflector, and an LED uplight for emitting light in an upward direction, the first reflector being positioned above the LED uplight. In some embodiments, the light assembly also includes a second reflector positioned below said first reflector, said second reflector having a larger diameter than said first reflector. In some embodiments, the light assembly also includes a diffuser ring positioned above said LED up light for diffusing light emitted from said LED up light as it travels up towards reflective surfaces of said first and second reflectors. In some embodiments, the LED up light is a ring shaped assembly positioned inside a bottom portion of said second reflector.

13 Claims, 17 Drawing Sheets

(51) Int. Cl.
*F21V 21/04* (2006.01)
*F21V 29/89* (2015.01)
*G02B 27/09* (2006.01)
*F21V 29/77* (2015.01)
*H05B 33/08* (2006.01)
*F21V 3/06* (2018.01)
*F21Y 115/10* (2016.01)
*F21Y 113/13* (2016.01)
*F21Y 105/18* (2016.01)

(52) U.S. Cl.
CPC ....... *F21Y 2105/18* (2016.08); *F21Y 2113/13* (2016.08); *F21Y 2115/10* (2016.08)

(56) References Cited

U.S. PATENT DOCUMENTS

| | | | | | |
|---|---|---|---|---|---|
| 6,655,819 | B2* | 12/2003 | Loga | ......................... | F21S 8/02 |
| | | | | | 362/222 |
| 8,070,328 | B1* | 12/2011 | Knoble et al. | ............ | F21V 3/00 |
| | | | | | 362/311.02 |
| 8,220,970 | B1* | 7/2012 | Khazi | .................... | F21V 29/004 |
| | | | | | 362/373 |
| 2003/0063461 | A1* | 4/2003 | Tant | ........................ | F21S 8/033 |
| | | | | | 362/147 |
| 2009/0067172 | A1* | 3/2009 | Inoue | ........................ | F21S 8/026 |
| | | | | | 362/346 |
| 2011/0080741 | A1* | 4/2011 | Noh | ........................ | F21S 8/026 |
| | | | | | 362/294 |
| 2012/0069562 | A1* | 3/2012 | Singer et al. | ......... | F21V 7/0025 |
| | | | | | 362/235 |
| 2014/0160736 | A1* | 6/2014 | Chung | ..................... | F21S 8/03 |
| | | | | | 362/249.02 |

* cited by examiner

1300A

| Item Description | Designator |
|---|---|
| PCB,FR4,86.5*41*1.2mm,4*1,RoHS | |
| IC IW3640-00 | U1 |
| 2A/1000V(DB207S,DFS SMD | BD1 |
| RS1M,1A/1000V,DO-214AC | D5,D9 |
| M7,1A/1000V,DO-214AC | D1,D2,D3,D6 |
| US3G,3A/400V,DO-214AA | D4,D7 |
| SS36,3A/60V,DO-214AC | D10 |
| 15V/0.5W,LL-34 | Z1,Z2 |
| MMBTA06,1GM(SOT-23) | Q3,Q5 |
| CSF501D,600V/12MA(SOT-23) | Q4 |
| 47pF/50V,±5%,125°C(0805) | C6,C9,C10 |
| 6.8nF/50V,±10%,125°C(0805) | C7,C8,C17,R36 |
| X7R 1nF/1KV,±10%,125°C(1206) | C5,C11 |
| 680pF/500V,±10%,125°C(1206) | C12 |
| 1/8W,4.7K±5%(0805) | R1,R31 |
| 1/8W,330KΩ±1%(0805) | R2,R3,R4,R5 |
| 1/8W,1M±1%(0805) | R9,R15,R16 |
| 1/8W,100K±1%(0805) | R7,R19 |
| 1/4W,5.1R±5%(1206) | R10,R11,R12,R13,R28,R29 |
| 1/8W,10K±1%(0805) | R14,R17,R30,R32 |
| 1/8W,30R±1%(0805) | R18 |
| 1/8W,1K±1%(0805) | R20 |
| 1/4W,3R±1%(1206) | R21 |
| 1/4W,4.3R±1%(1206) | R22 |
| 1/8W,47K±1%(0805) | R23,R27,R33,R34 |
| 1/8W,2.2K±1%(0805) | R24,R26 |
| 1/4W,220K±5%(1206) | R25 |
| 120V,450mA/110mA | |
| 1A250V,VDRU,8.5*8*4 | F1 |
| 07mm 270V±10% 5P | VR1 |
| DR10X10 3mH±10% | L1 |
| UU9.8 (190:190) 50mH | L2 |
| 9*5*3 1mH±30% | L3 |
| PFC EE13,80:26,0.5mH | T1 |
| PQ2020,25:18:25:18,1mH | T2 |
| SFF10N65(TO-220F) | Q1 |
| MJE13007,20<β<30,TO-220FP | Q2 |
| 2N60,2A/600V(TO-251) | Q6 |
| sharp PC817C | U2 |
| 0.1uF/305V,±10%,P=10%T=5 | CX1,CX2 |
| 22nF/275V,±10%,P=10 | CX3 |
| 2.2nF/250V,±20%,P=7.5 | CY1,CY2 |
| 2.2nF/400V,±20%,P=10 | CY3 |
| 100nF/400V,±10%,P=15 | C1 |
| 8xA 22uF/250V,±20%,105°C,Φ13*22 | C2 |
| 22uF/50V,±20%,105°C,Φ5*11 | C3,C4,C13,C14,C16 |
| 47uF/50V,±20%,105°C,Φ6.5*11.5 | C15 |
| 1W 15KΩ±5% | R8 |
| 1W 3.9R±5% | R35 |
| NTC 10D7 10R±20% | TR1 |
| NTC 47KΩ±5%,B=3950±5% | TR2 |
| 18 # 220 black Teflon cable length , semi-stripping 13 / immersion tin 3 | L |
| 18 # 220 black Teflon cable length , semi-stripping 13 / immersion tin 3 | N |
| # 18 Red Teflon wire length 150 , semi-stripping 13 / immersion tin 3 | LED1+,LED2+ |
| # 18 Red Teflon wire length 150 , semi-stripping 13 / immersion tin 3 | LED1-,LED2- |
| 18 # green multi-core PVC cable length 80 , semi-stripping 10 / 3.2 ring terminals | G |
| Beads , RH3.5 * 3 * 1.5 Nickel Zinc | Sets Q1, Q2 middle pin |
| Dimming LED drive insert variable heating 120V, 450mA / 110mA | |
| Black shrink tube diameter Φ3x30, temperature 150 °C, CUL certification | Sets of input and output lines |
| Bicompositional parts potting silicone | |
| White PBT insulation film 140 × 118 × 0.25 | |
| DUO DOWNLIGHT aluminum drive cover | |
| DUO DOWNLIGHT aluminum drive bottom box | |
| Aluminum screws Φ3.2x5mm nickel or zinc | Solid ground and housing |

FIG. 13A

| | level | dimming | Lumens | Wattage | Lm/W | CCT | Ra | SDCM | Beam angle |
|---|---|---|---|---|---|---|---|---|---|
| HR3D-R092722S-WT | 1 | 100% | 767.63 | 15.95 | 48.14 | 2759 | 91.8 | 1.7 | 21.5° |
| | 2 | 80% | 572.46 | 12.98 | 44.1 | 2718 | 92.2 | 0.9 | 21.5° |
| | 3 | 60% | 365.22 | 9.681 | 37.73 | 2664 | 92.5 | 2.8 | 21.4° |
| | 4 | 40% | 255.81 | 7.901 | 32.38 | 2623 | 92.5 | 4.7 | 21.5° |
| | 5 | 20% | 27.085 | 3.181 | 8.513 | 2150 | 95 | 21.5 | 22.6° |
| | 6 | 10% | 3.9945 | 1.503 | 2.657 | 2042 | 94 | 30 | 120.4° |

LED LIGHTING METHODS AND APPARATUS

RELATED APPLICATION

The present application claims the benefit of the filing date of U.S. Provisional Application Ser. No. 62/294,297 filed Feb. 11, 2016 which is hereby expressly incorporated by reference in its entirety.

FIELD

The present application relates to LED (Light Emitting Diode) lighting methods and apparatus, and, more particularly, with regard to LED lighting methods and apparatus which are well suited for changing correlated color temperature (CCT), light output and light distribution.

BACKGROUND

Interior and exterior lighting often involves illuminating different areas of an environment with different amounts of light, with lights of different colors and/or with lights that have beams of different widths. In many instances, lighting that can be used to set the right mood for the environment and/or activity to be performed in the environment through changing the correlated color temperature (CCT), light output and light distribution. Depending on the activity, the lighting theme for the environment may need to change from bright to dim, crisp white to warmer tone, and/or from spot to ambient distribution. This is especially true for multi-functional residential and/or commercial spaces, television rooms, or areas with heavy visual display usage. Multiple luminaries and/or specialized dimming units are typically used to achieve these functions. The use of multiple luminaries and/or specialized dimming units can be expensive. For example when reading in the environment it is desirable to have a bright, crisp white light with a spot distribution. Whereas when having dinner with a companion in the environment it may be more desirable to have a dimmer warmer light with an ambient distribution.

In view of the above it should be appreciated that there is a need for new methods and/or apparatus which can support a wide variety of lighting characteristics. It would be desirable if the supported lighting characteristics included the ability to change the color, e.g., correlated color temperature (CCT) of the light, the light output and/or the light distribution without the use of multiple luminaries/lighting assemblies and/or multiple and/or specialized dimming units for changing the color of the light, e.g., (CCT), the light output and/or the light distribution.

Furthermore it would be desirable if changes in one or more of these characteristics of light color, light output and light distribution could be made dynamically in a single LED lighting apparatus using a single regular dimming unit.

SUMMARY

The present invention is directed to new methods and apparatus for implementing an LED light assembly in an efficient and cost effective manner with the ability to change multiple lighting characteristics including light color, light output and/or light distribution characteristics. Various embodiments of the present invention address one, some or all of the problems described above. An exemplary embodiment of the present invention includes a light assembly comprising: a first reflector; an LED downlight for emitting light in a downward direction through a cavity formed by said first reflector; an LED uplight for emitting light in an upward direction, said first reflector being positioned above said LED uplight.

While various features and elements are described in this summary all features and elements are not necessary or required for all embodiments of the invention.

In some, but not all, embodiments, the light assembly further includes a second reflector positioned below the first reflector, the second reflector having a larger diameter than the first reflector.

In some embodiments, the LED up light of the light assembly is a ring shaped assembly positioned inside a bottom portion of said second reflector.

In some embodiments, the light assembly further includes: a diffuser ring position above said LED up light for diffusing light emitted from said LED up light as it travels up towards reflective surfaces of said first and second reflectors.

In some embodiments, the LED down light and the LED up light of the light assembly have different light output characteristics.

In some embodiments, the light output characteristics of the light assembly include color temperature and the down light outputs light in a first color temperature range and the LED up light outputs light in a second color temperature range.

In some embodiments of the light assembly, both the up light and down light output white light but with different color temperatures, the light from the down light and the light of the up light mixing in a mixture chamber formed by said first and second reflectors, said mixing producing a light output with a user controllable color temperature.

In some embodiments, the light assembly further comprises: a control circuit for controlling light output of the LED down light and light output of the LED up light as a function of a dimmer setting.

In some embodiments, the control circuit of the light assembly controls the color of the light output by said light assembly by controlling the amount of light output by the LED down light to the amount of light output by the LED up light based on the dimmer setting.

In some embodiments, the first reflector of the light assembly concentrates light over a smaller area than said second reflector.

In some embodiments, the control circuit of the light assembly controls said light assembly to act as a spot light with just the LED down light active at a first dimmer control setting and controls said light assembly to a wide angle light when said dimmer control is set to a second dimmer control setting.

Numerous additional features, benefits and embodiments are discussed in the detailed description which follows.

BRIEF DESCRIPTION OF THE FIGURES

FIG. 13A is a diagram illustrating a table including exemplary values for the designated components illustrated in the circuit of FIG. 13 and LED downlight lighting assembly 102 illustrated in FIG. 1.

DETAILED DESCRIPTION

Figure 1:
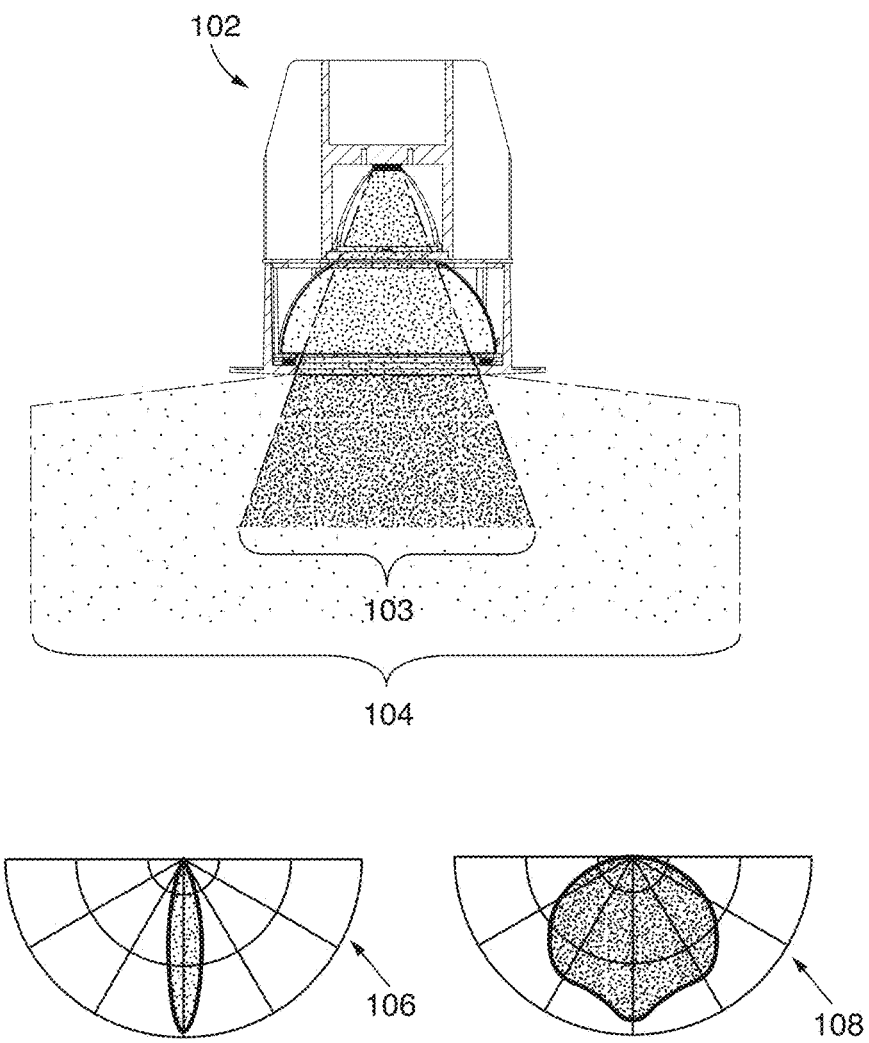
FIG. 1 is a drawing illustrating various features, including light distribution features, of an exemplary embodiment of a duo dual-source glare reducing LED downlight lighting assembly in accordance with the present invention.

FIG. 1 is a drawing illustrating various features of an exemplary embodiment of an duo dual-source glare reducing LED downlight lighting assembly 102 in accordance with the invention. Among the features illustrated by FIG. 1 is how the light assembly is a spot light at the maximum light output for task or localized lighting and becomes a wide distribution ambient light source as it dims down. The light distribution plot 106 shows the spotlight distribution with high brightness with dimming level set to its lowest level which is the spot light setting. The area identified by reference number 103 of FIG. 1 illustrates the beam width and light path for the high brightness with dimming level set to its lowest level which is the spot light setting. The darker high density shading/larger number of pixels per unit area in the area identified by reference number 103 represents the high brightness and greater intensity of light in the spot light area than the ambient wide area light area designated by reference number 104 in FIG. 1. The light distribution plot 108 shows the wide distribution ambient light distribution with lower brightness and showing the full progression of the beam angle. The area identified by reference number 104 in FIG. 1 illustrates the ambient wide area light area with the full progression of the beam angle for light emitted from the light assembly 102 with the dimming level to its highest level. The lower density of pixels/shading in the area identified by area 104 represents the lower brightness/intensity of the ambient light.

Figure 2:
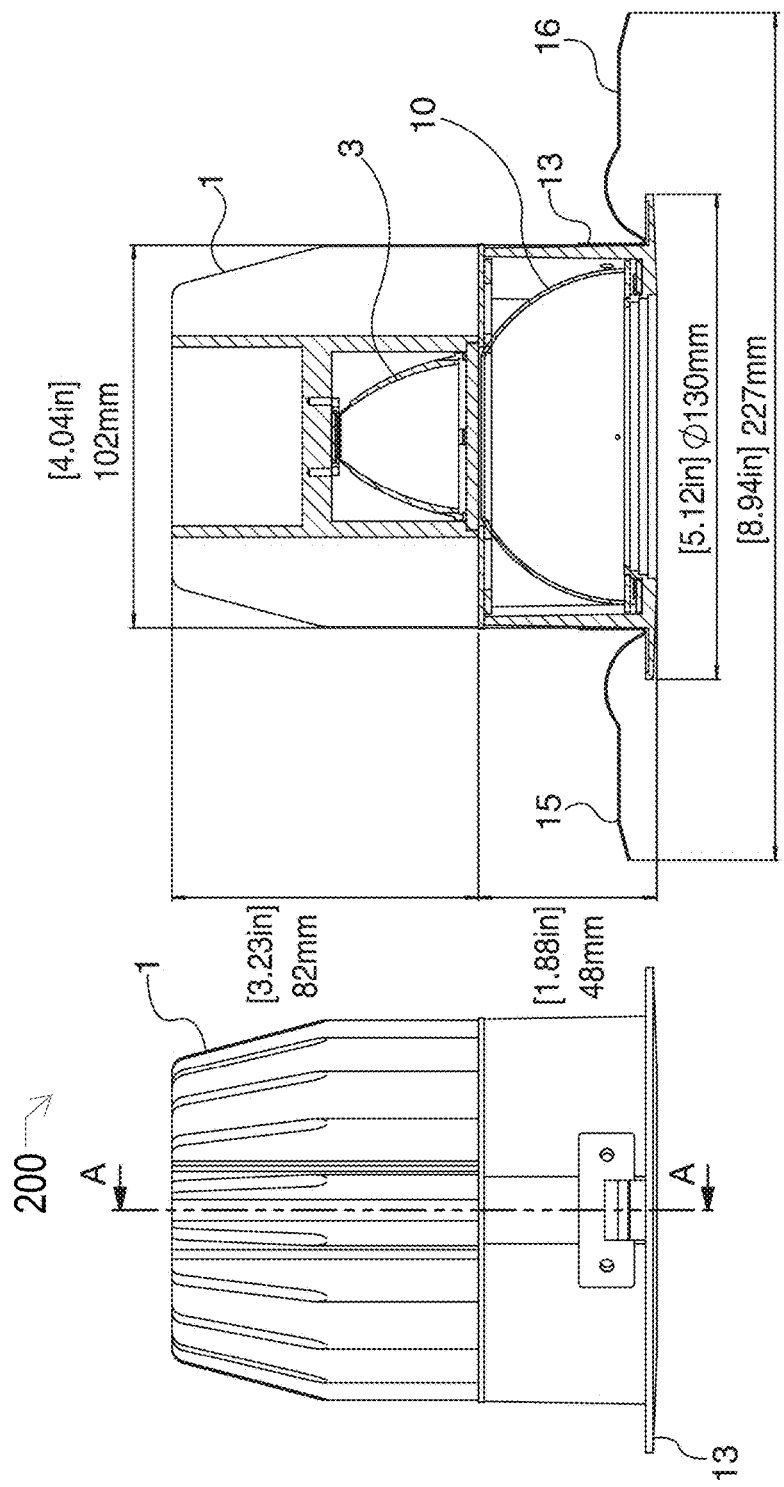
FIG. 2 is a drawing illustrating a side and cross-sectional view of the duo dual-source LED downlight lighting assembly of FIG. 1.

Drawing 200 of FIG. 2 illustrates a cross-sectional view of the duo downlight LED lighting assembly 102 of FIG. 1 with additional metal straps or tabs 15 and 16 which are secured to the heatsink 13 of the light assembly. In FIG. 2 reference number 1 is used to identify a primary heatsink 1, reference number 3 is used to identify a beam shaping element 3 which in this example is a reflector but may be, and in some embodiments is, a lens such as a TIR (total internal reflection) lens or other beam shaping component, reference number 10 is used to refer to a light redirection element which in this exemplary embodiment is a reflector but may be, and in some embodiments is a lens or other light redirection component, while reference number 13 is used to refer to a second heatsink 13 which in some embodiments has a circular appearance when viewed from below but which has an internal sidewall extending upward as can be seen more clearly in FIG. 3 and to which retaining straps 15, 16 can be secured. In some embodiments the metal straps are secured to opposite sides of the circular trim heatsink 13 using rivets and/or screws.

The metal straps 15 and 16 serve as retaining clips or springs to hold the LED lighting assembly 102 in place once installed into a mounting surface such as for example a sheetrock ceiling or a ceiling tile.

While various dimensions are shown in the FIG. 2, these dimensions are only exemplary in nature. The figures are not necessarily drawn to scale as emphasis is placed on explaining the invention and the invention is applicable to lighting assemblies and parts of differing dimensions.

Figure 3:
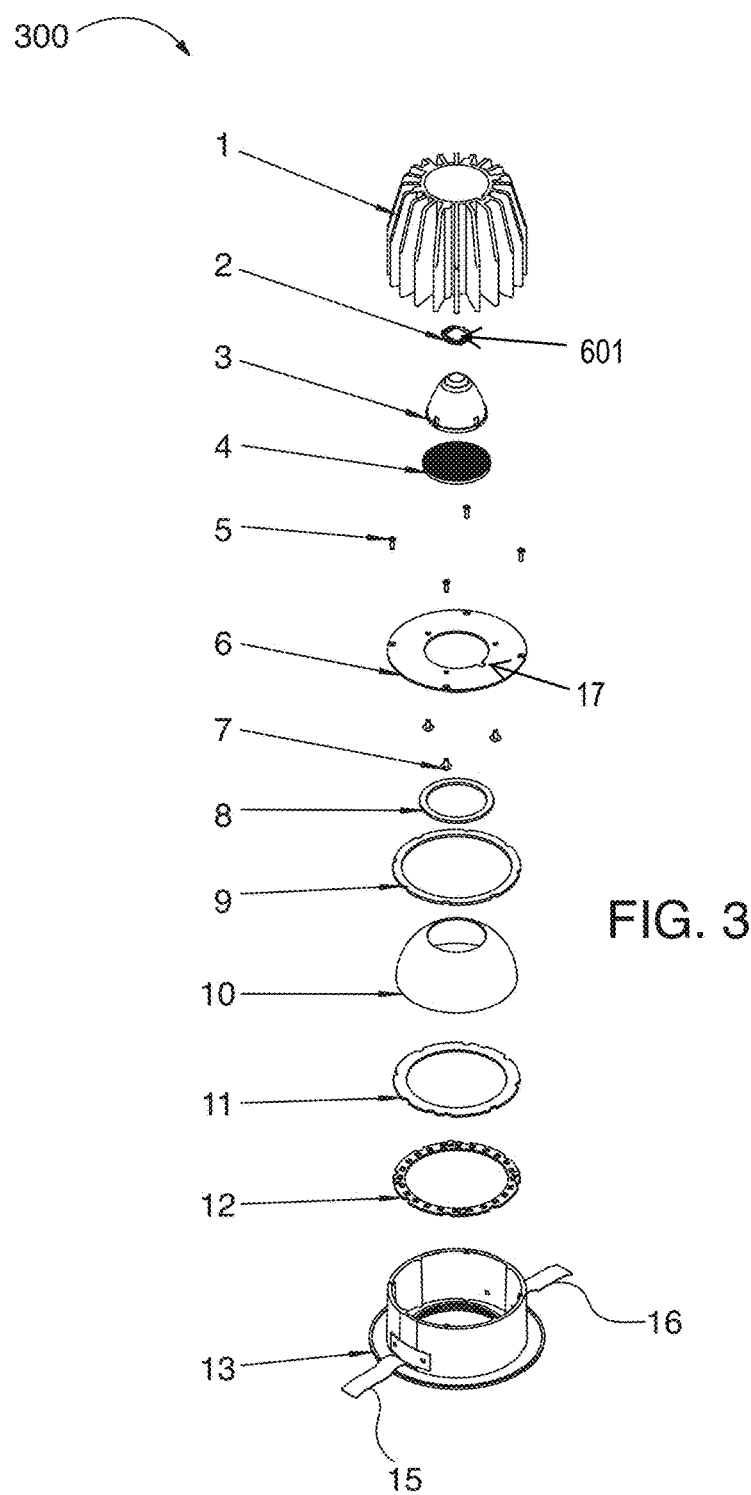
FIG. 3 is a drawing illustrating an exploded view of the exemplary duo dual-source LED downlight lighting assembly of FIG. 1.

Drawing 300 of FIG. 3 is a drawing illustrating an exploded view of the exemplary duo dual-source LED downlight lighting assembly shown in FIGS. 1 and 2 illustrating various components and features of the lighting assembly. The duo downlight lighting assembly includes the following components as shown in FIG. 3: a primary heatsink 1, a primary LED light source 2 such as for example an LED module or assembly with a plurality of separate LEDs that produce light (the light emitted from the primary LED light source 2 sometimes referred to as LED 1 emits light in a downward direction toward the primary diffuser 4), a beam shaping element 3 which in this example is a reflector but may be, and in some embodiments is, a lens such as a TIR (total internal reflection) lens or other beam shaping component, a primary diffuser 4, first assembly screws 5 in this case four screws for holding the assembly together, assembly plate 6, second assembly screws 7, a first seal 8, e.g., a gasket, for preventing light leakage, a second seal 9, e.g., a gasket which centers components of the light assembly, a light redirection element 10 which in this exemplary embodiment is a reflector but may be, and in some embodiments is a lens or other light redirection component, a secondary diffuser 11, a secondary LED light source 12 such as for example an LED module or assembly including a plurality of separate LEDs that produce light which is directed upward, and trim 13 which is a second heatsink 13. The trim is circular in shape and is sometimes referred to as a trim ring. The trim ring second heatsink 13 includes a raised inner sidewall which is part of a cylinder, which extends upward from a flat flange. The flat flange appears as a flat ring when viewed from below. In some embodiments retaining straps, tabs or spring plates 15 and 16 are secured to the outer surface of the sidewall. The retaining straps 15, 16 are for holding or securing the light assembly in place. In some embodiments including the exemplary embodiment light assembly embodiment 102, the retaining tabs or straps are made of metal and are attached to opposite sides of the circular second heat sink trim 13 with rivets.

In most, but not all embodiments, when a reflector is used for the beam shaping element 3, the interior surface of the reflector will have a polished finished surface or a mirrored surface. In some embodiments, the primary diffuser 4 is a clear glass lens. In some embodiments, in which the light redirection element 10 is a reflector the interior surface of the reflector cavity has a white matte highly reflective finish. In most embodiments, the reflector 10 is not a mirrored finish surface.

The primary heatsink 1 is in most, but not all embodiments, made of cast aluminum. The primary LED light source 2 is a semiconductor component used to emit light in a downward direction. The LED 601 is at the center of the LED light source 2. The primary beam shaping element 3 is a reflector in the LED light assembly 102 which, in some but not all embodiments, is made of aluminum with a mirrored or polished interior surface. The primary diffuser 4 in some embodiments is made of a diffusive glass. In some embodiments, the assembly screws 5 and 7 are made of stainless steel while the assembly plate 6 is an aluminum sheet. The plate 6 includes a notch 17 through which wires can pass to the LED 601. The seals or gaskets 8 and 9 are in some embodiments a PU (polyurethane) foam. The seal or gasket 8 is used to prevent light leak while the seal or gasket 9 is used to center components in the light assembly 102. The secondary beam shaping element 10 also referred to as the light redirection element 10, is in some embodiments such as the light assembly 102 embodiment, an aluminum reflector with matte interior surface finish. In some embodiments the aluminum reflector 10 is painted white. The secondary diffuser 11 in some, but not all embodiments, is made of polycarbonate. The secondary LED light source 12 includes one or more semiconductor components which emit light in an upward direction. The trim/secondary heatsink 13 is typically made of case aluminum.

The elements 10, 11 and 12 form an uplight lighting system in which light from the LED light source 12 is emitted up from the light source through the diffuser 12 and is then reflected down by light redirection element 10.

Figure 4:
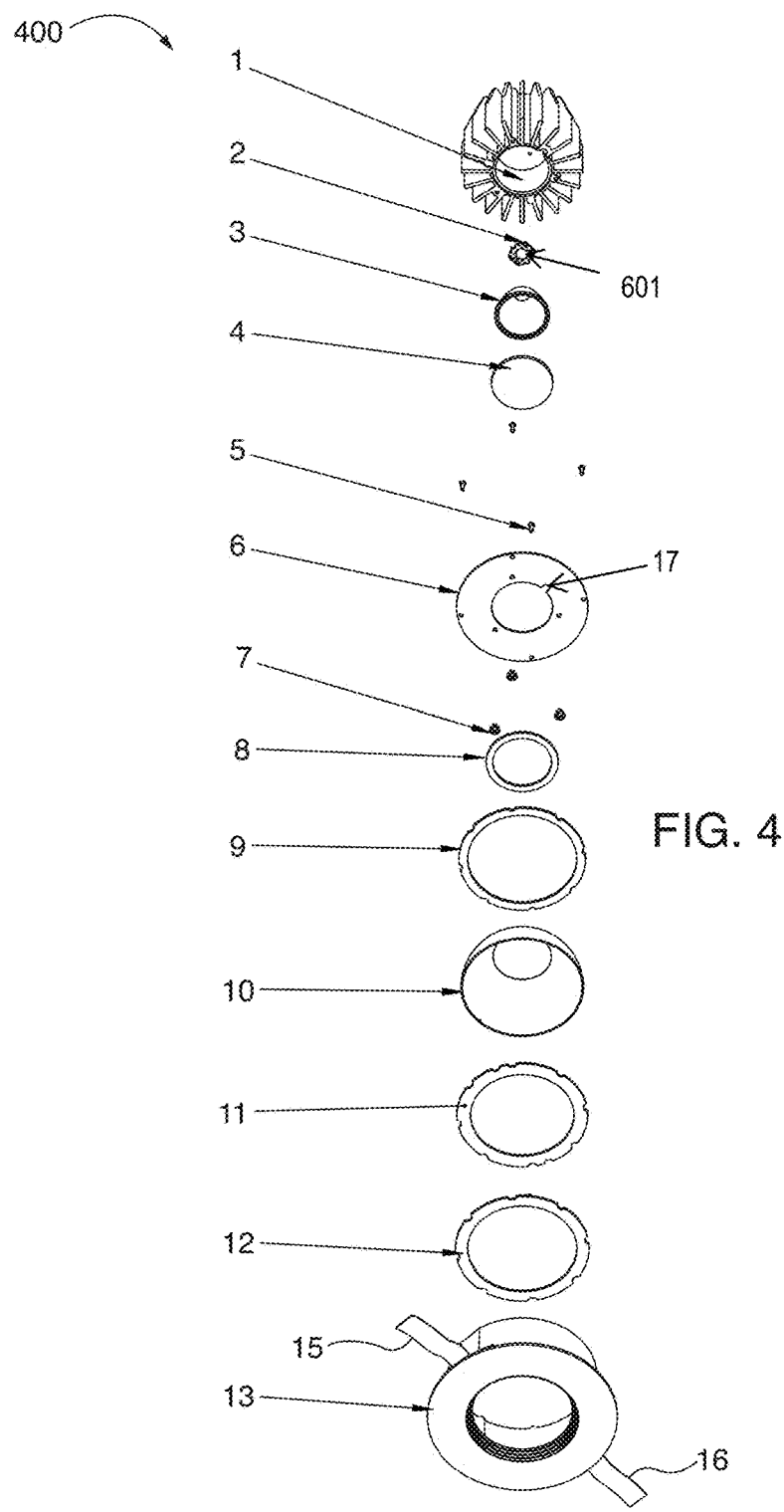
FIG. 4 is a drawing illustrating the components shown in FIG. 3 of the exemplary duo dual-source LED downlight lighting assembly from a different perspective.

Drawing 400 of FIG. 4 illustrates the components shown in FIG. 3 from a different perspective. The same reference numerals are used in various figures in the present application, including FIGS. 3 and 4, to refer to the same or similar elements. Since the elements shown in FIG. 4 have been explained with regard to the discussion of FIG. 3 they will not be discussed again with regard to FIG. 4.

Figure 5:
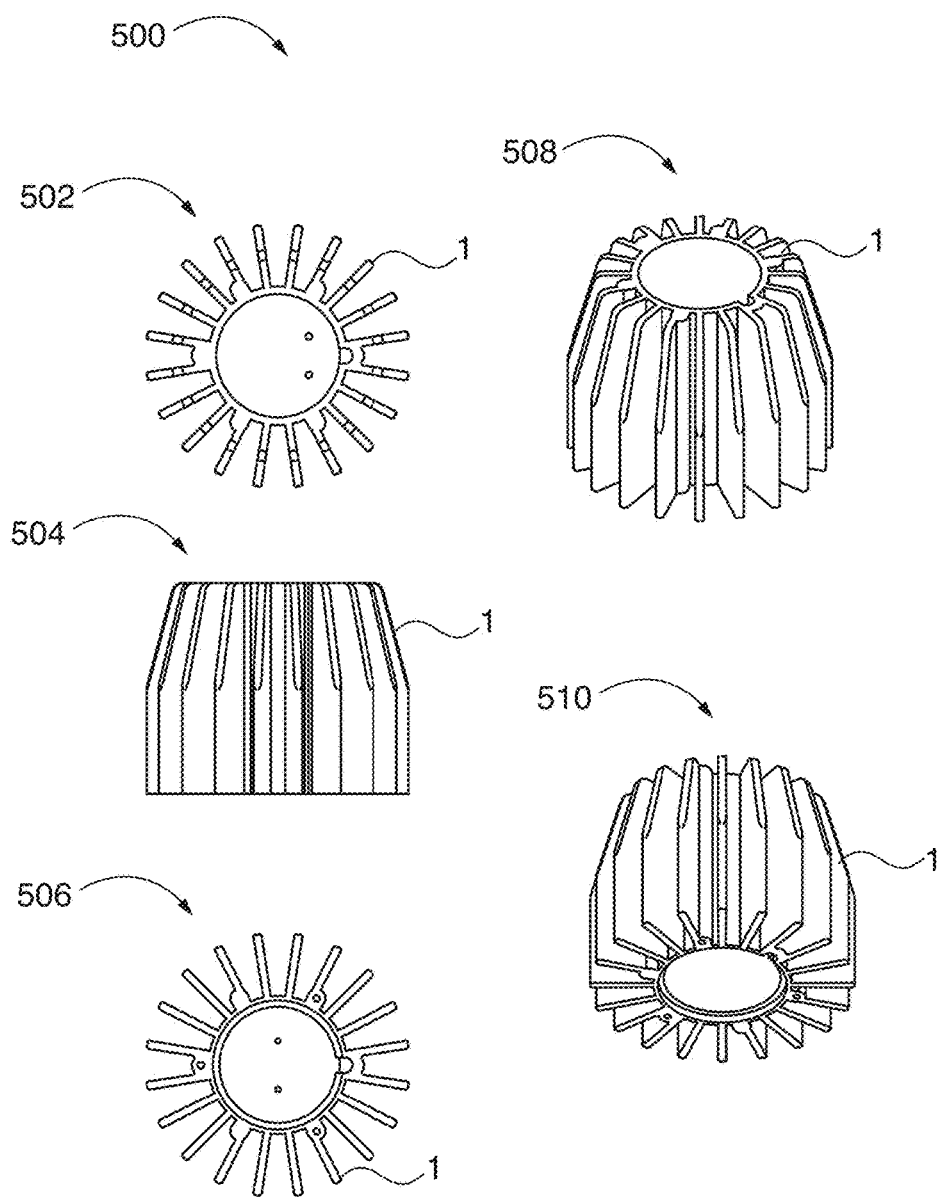
FIG. 5 is a drawing illustrating various views of the primary heatsink 1 of FIG. 3 shown from a number of different perspectives.

Drawing 500 of FIG. 5 is a drawing illustrating the primary heatsink 1 of FIG. 3 shown from a number of different perspectives. Perspective view 502 illustrates the primary heatsink 1 as viewed from a first perspective. Perspective view 504 illustrates the primary heatsink 1 as viewed from a second perspective. Perspective view 506 illustrates the primary heatsink 1 as viewed from a third perspective. Perspective view 508 illustrates the primary heatsink 1 as viewed from a fourth perspective. Perspective view 510 illustrates the primary heatsink 1 as viewed from a fifth perspective.

Figure 6:
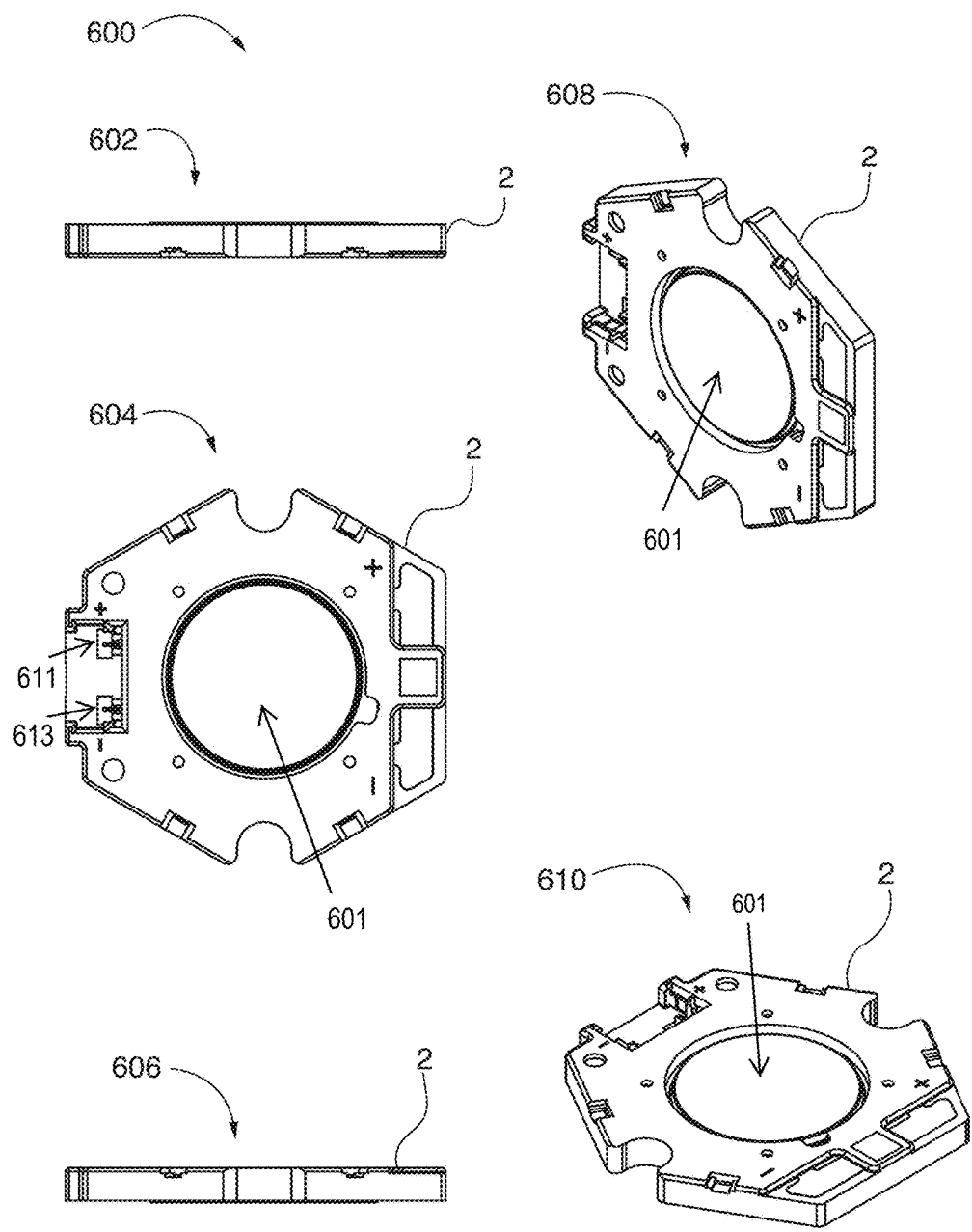
FIG. 6 is a drawing illustrating various views of the primary LED light source 2 of FIG. 3 shown from a number of different perspectives.

Drawing 600 of FIG. 6 is a drawing illustrating the primary LED light source 2 of FIG. 3 shown from a number of different perspectives. Perspective view 602 illustrates the primary LED light source 2 as viewed from a first perspective. Perspective view 604 illustrates the primary LED light source 2 as viewed from a second perspective. In perspective view 604 positive 611 and negative 613 terminals are visible. Wires (not shown) are connected to these terminals 611, 613 to power the LED 601. Perspective view 606 illustrates the primary LED light source 2 as viewed from a third perspective. Perspective view 608 illustrates the primary LED light source 2 as viewed from a fourth perspective. Perspective view 610 illustrates the primary LED light source 2 as viewed from a fifth perspective.

Figure 7:
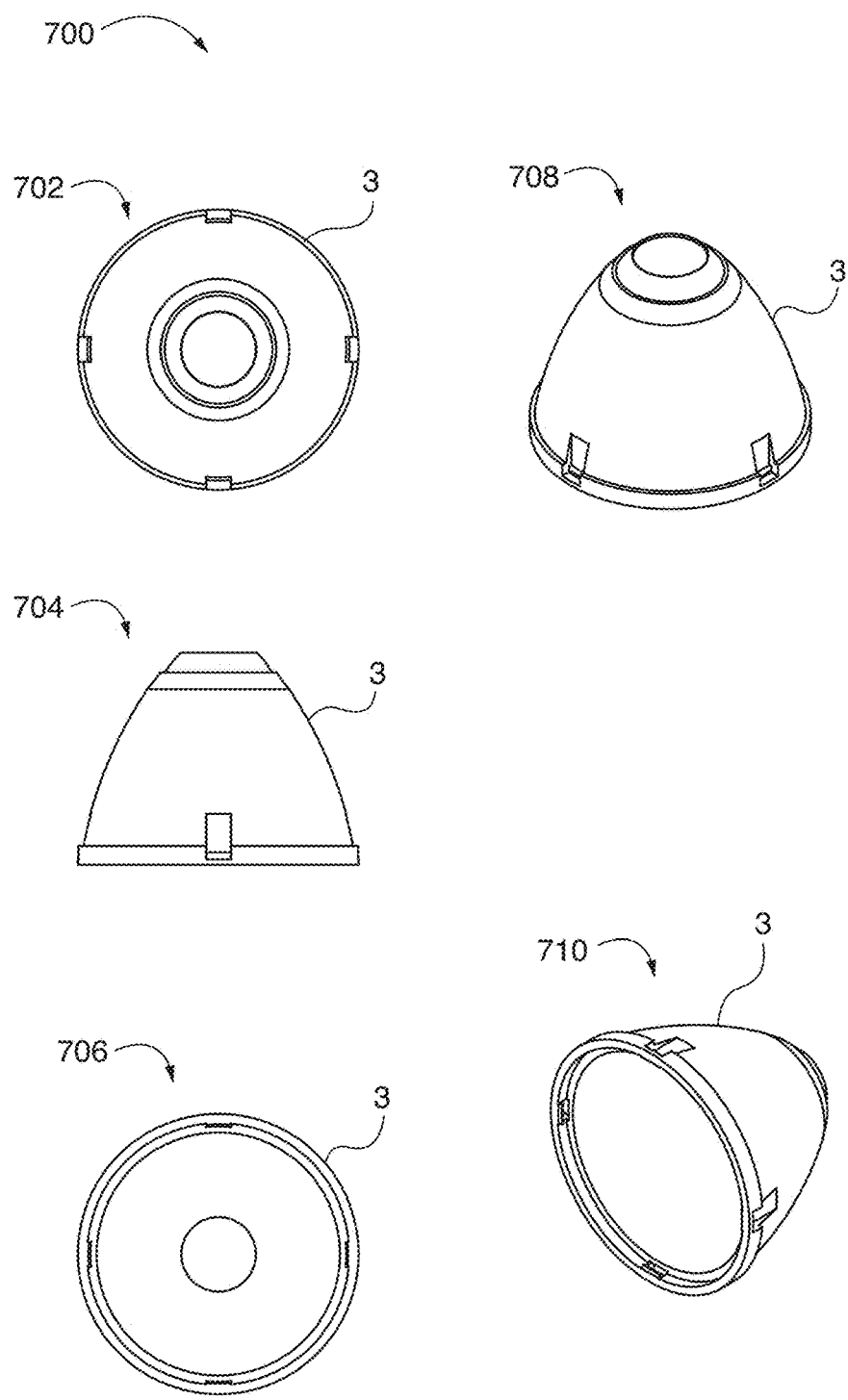
FIG. 7 is a drawing illustrating various views of the beam shaping element 3 of FIG. 3, which in this exemplary embodiment is a reflector, shown from a number of different perspectives.

Drawing 700 of FIG. 7 is a drawing illustrating the beam shaping element 3 of FIG. 3, which as previously discussed is a reflector in this exemplary embodiment, shown from a number of different perspectives. Perspective view 702 illustrates the beam shaping element 3 as viewed from a first perspective. Perspective view 704 illustrates the beam shaping element 3 as viewed from a second perspective. Perspective view 706 illustrates the beam shaping element 3 as viewed from a third perspective. Perspective view 708 illustrates the beam shaping element 3 as viewed from a fourth perspective. Perspective view 710 illustrates the beam shaping element 3 as viewed from a fifth perspective.

Figure 8:
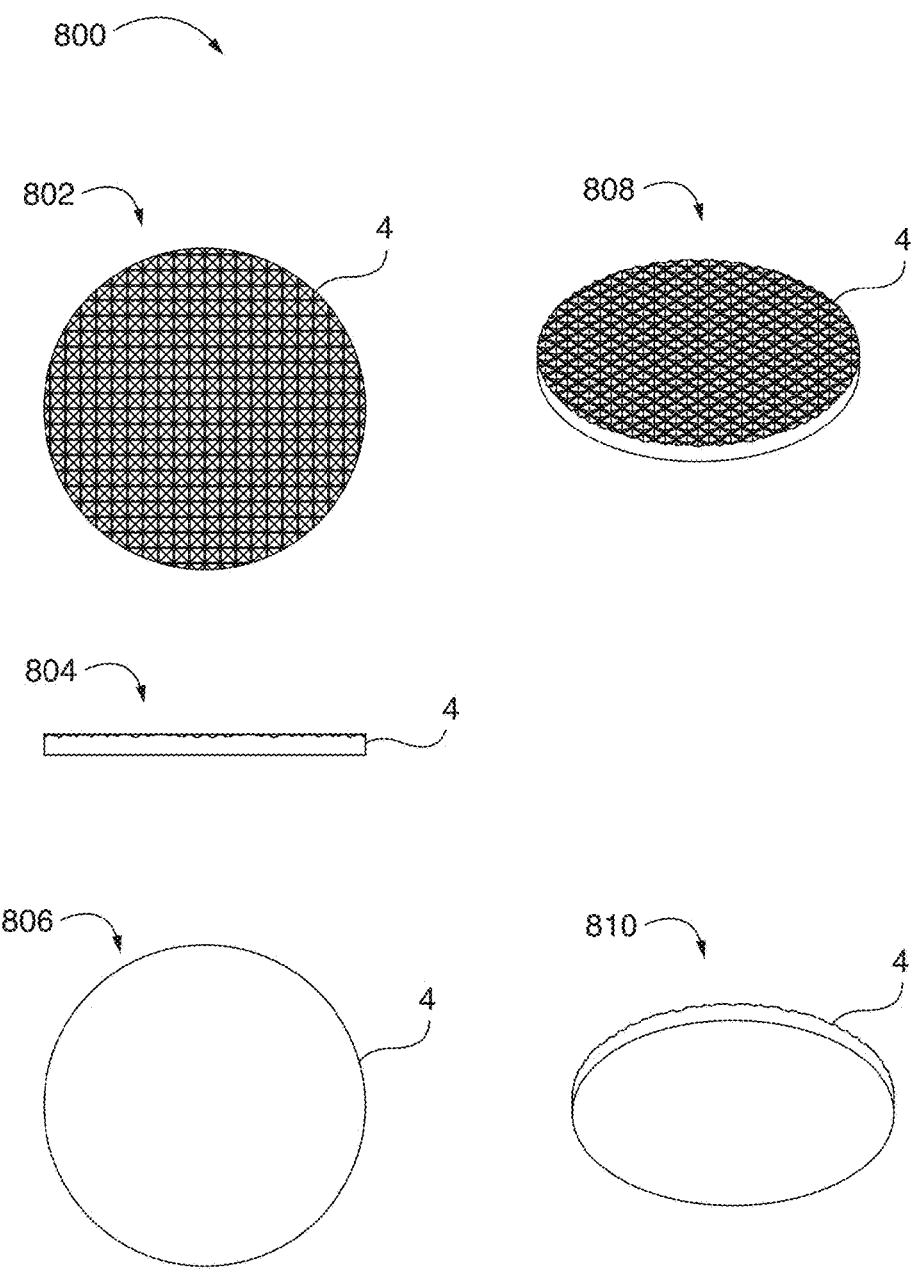
FIG. 8 is a drawing illustrating various views of the primary diffuser 4 of FIG. 3 shown from a number of different perspectives.

Drawing 800 of FIG. 8 is a drawing illustrating the primary diffuser 4 of FIG. 3 shown from a number of different perspectives. Perspective view 802 illustrates the primary diffuser 4 as viewed from a first perspective. Perspective view 804 illustrates the primary diffuser 4 as viewed from a second perspective. Perspective view 806 illustrates the primary diffuser 4 as viewed from a third perspective. Perspective view 808 illustrates the primary diffuser 4 as viewed from a fourth perspective. Perspective view 810 illustrates the primary diffuser 4 as viewed from a fifth perspective.

Figure 9:
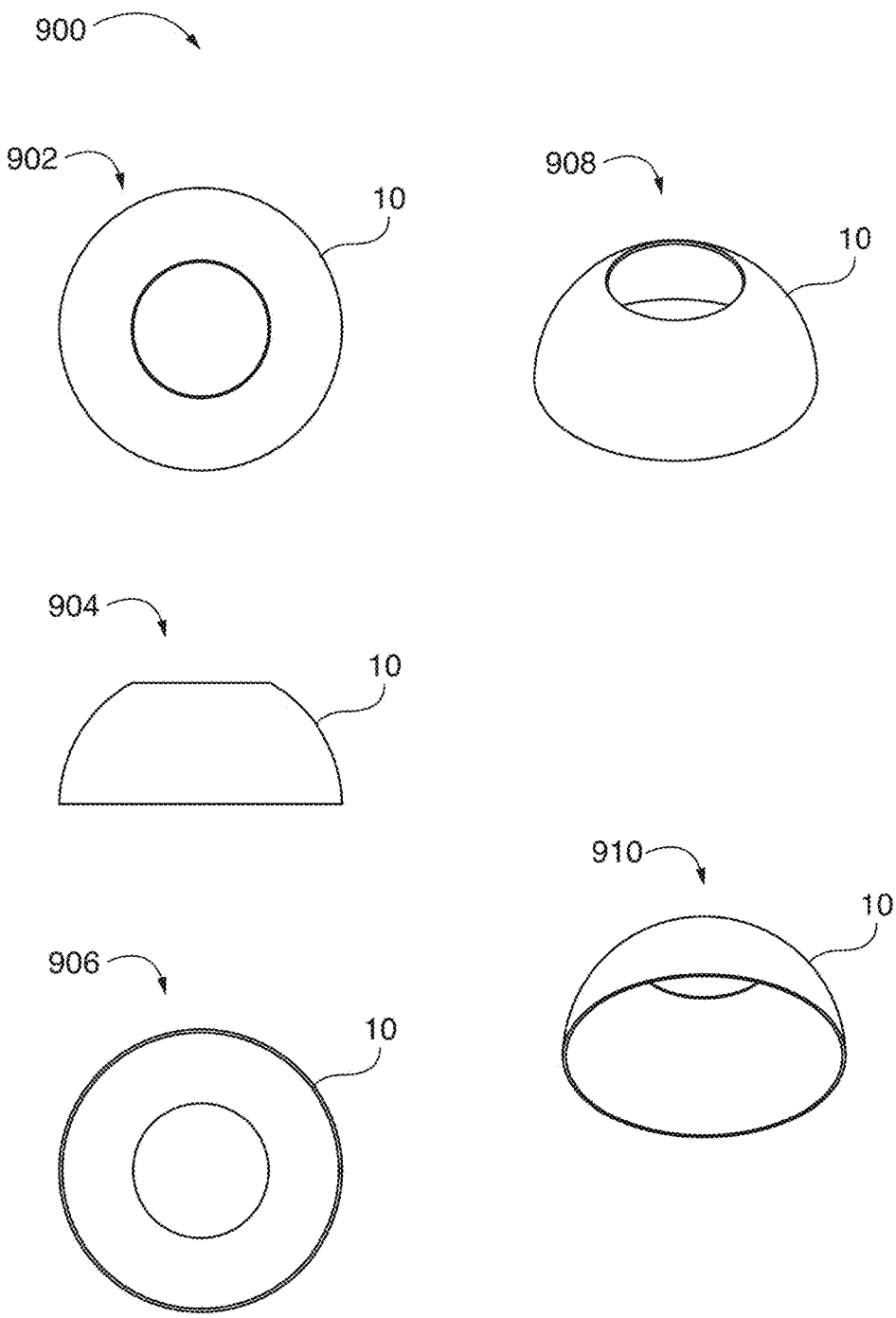
FIG. 9 is a drawing illustrating various views of the light redirection element 10 of FIG. 3 which in this exemplary embodiment is a reflector, shown from a number of different perspectives.

Drawing 900 of FIG. 9 is a drawing illustrating the light redirection element 10 of FIG. 3 which in this exemplary embodiment is a reflector, shown from a number of different perspectives. Perspective view 902 illustrates the light redirection element 10 as viewed from a first perspective. Perspective view 904 illustrates the light redirection element 10 as viewed from a second perspective. Perspective view 906 illustrates the light redirection element 10 as viewed from a third perspective. Perspective view 908 illustrates the light redirection element 10 as viewed from a fourth perspective. Perspective view 910 illustrates the light redirection element 10 as viewed from a fifth perspective.

Figure 10:
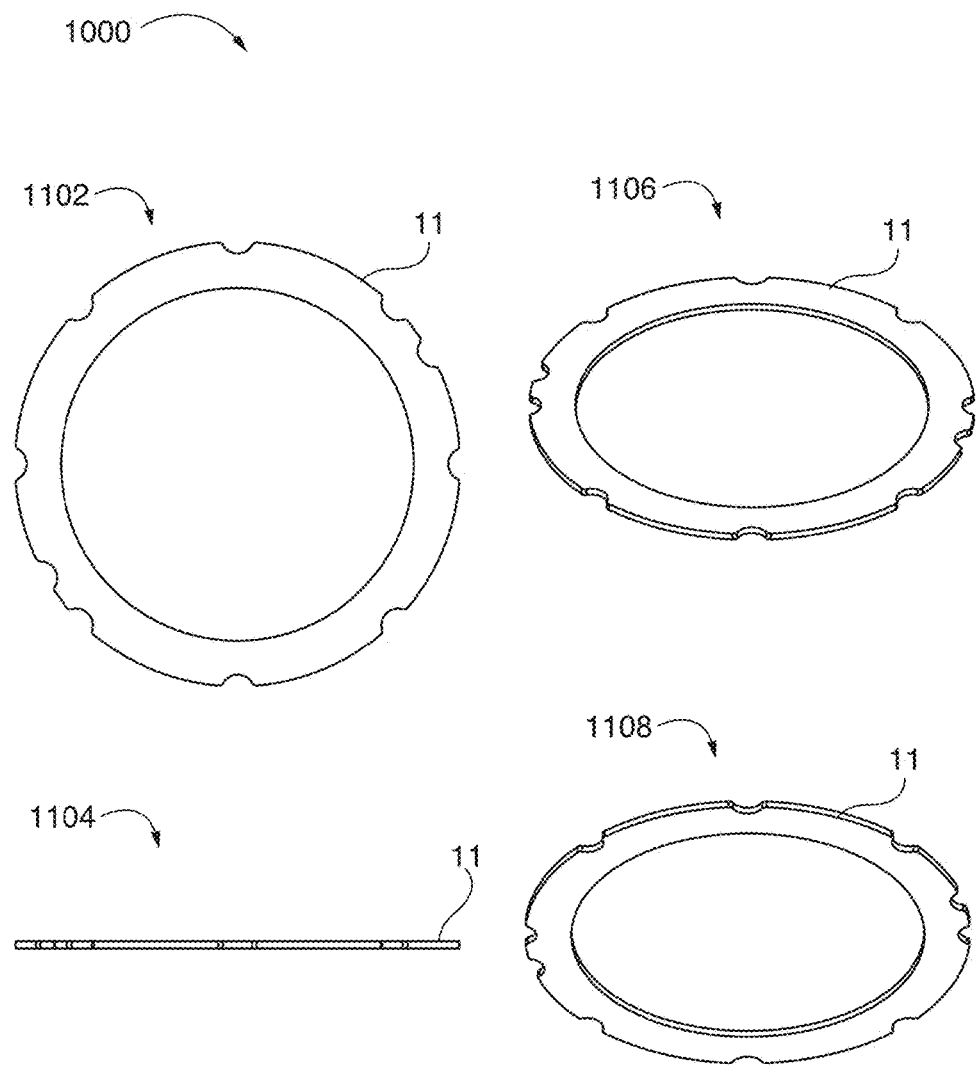
FIG. 10 is a drawing illustrating various views of the secondary diffuser 11 of FIG. 3 shown from a number of different perspectives.

Drawing 1000 of FIG. 10 is a drawing illustrating the secondary diffuser 11 of FIG. 3 shown from a number of different perspectives. Perspective view 1002 illustrates the secondary diffuser 11 as viewed from a first perspective. Perspective view 1004 illustrates the secondary diffuser 11 as viewed from a second perspective. Perspective view 1006 illustrates the secondary diffuser 11 as viewed from a third perspective. Perspective view 1008 illustrates the secondary diffuser 11 as viewed from a fourth perspective. Perspective view 1010 illustrates the secondary diffuser 11 as viewed from a fifth perspective.

Figure 11:
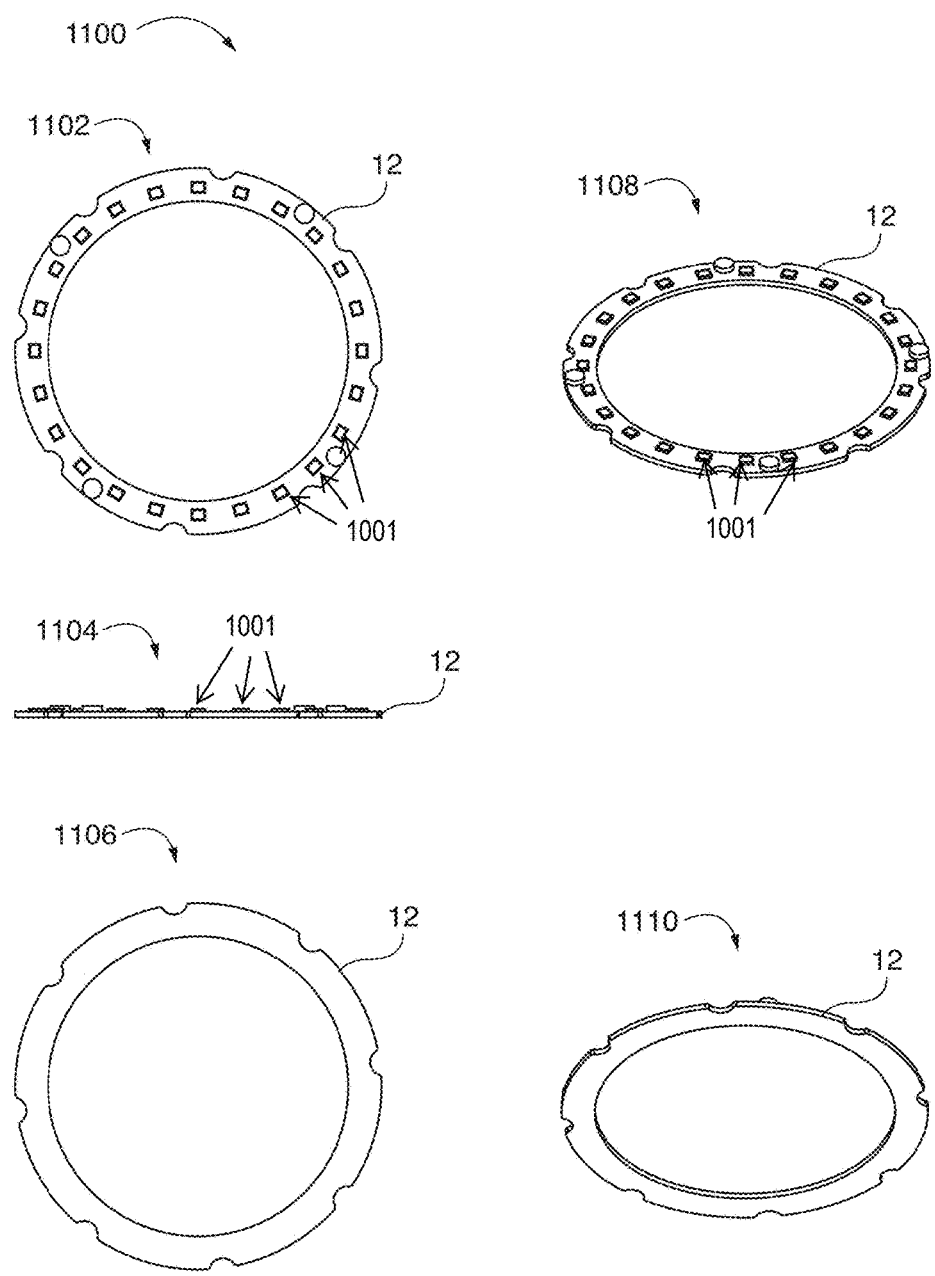
FIG. 11 is a drawing illustrating various views of the secondary LED light source 12 of FIG. 3 shown from a number of different perspectives.

Drawing 1100 of FIG. 11 is a drawing illustrating the secondary LED light source 12 of FIG. 3 shown from a number of different perspectives. Perspective view 1102 illustrates the secondary LED light source 12 as viewed from a first perspective. LEDs are shown as rectangles 1001 and are distributed around the LED light source 12, in a generally uniform manner in some but not necessarily all embodiments, to direct light upward when the secondary light source 12 is installed and activated in the lighting device 102. Perspective view 1104 illustrates the secondary LED light source 12 as viewed from a second perspective. Perspective view 1106 illustrates the secondary LED light source 12 as viewed from a third perspective. Perspective view 1108 illustrates the secondary LED light source 12 as viewed from a fourth perspective. Perspective view 1110 illustrates the secondary LED light source 12 as viewed from a fifth perspective. The LED light source 12 is a ring including a plurality of LEDs. The LEDs are shown are as rectangles dispersed around the ring of the LED light source 12 in drawings 1102 and 1108. In some, but not all embodiments, the spacing between the LEDs around the ring is equal or approximately equal.

Figure 12:
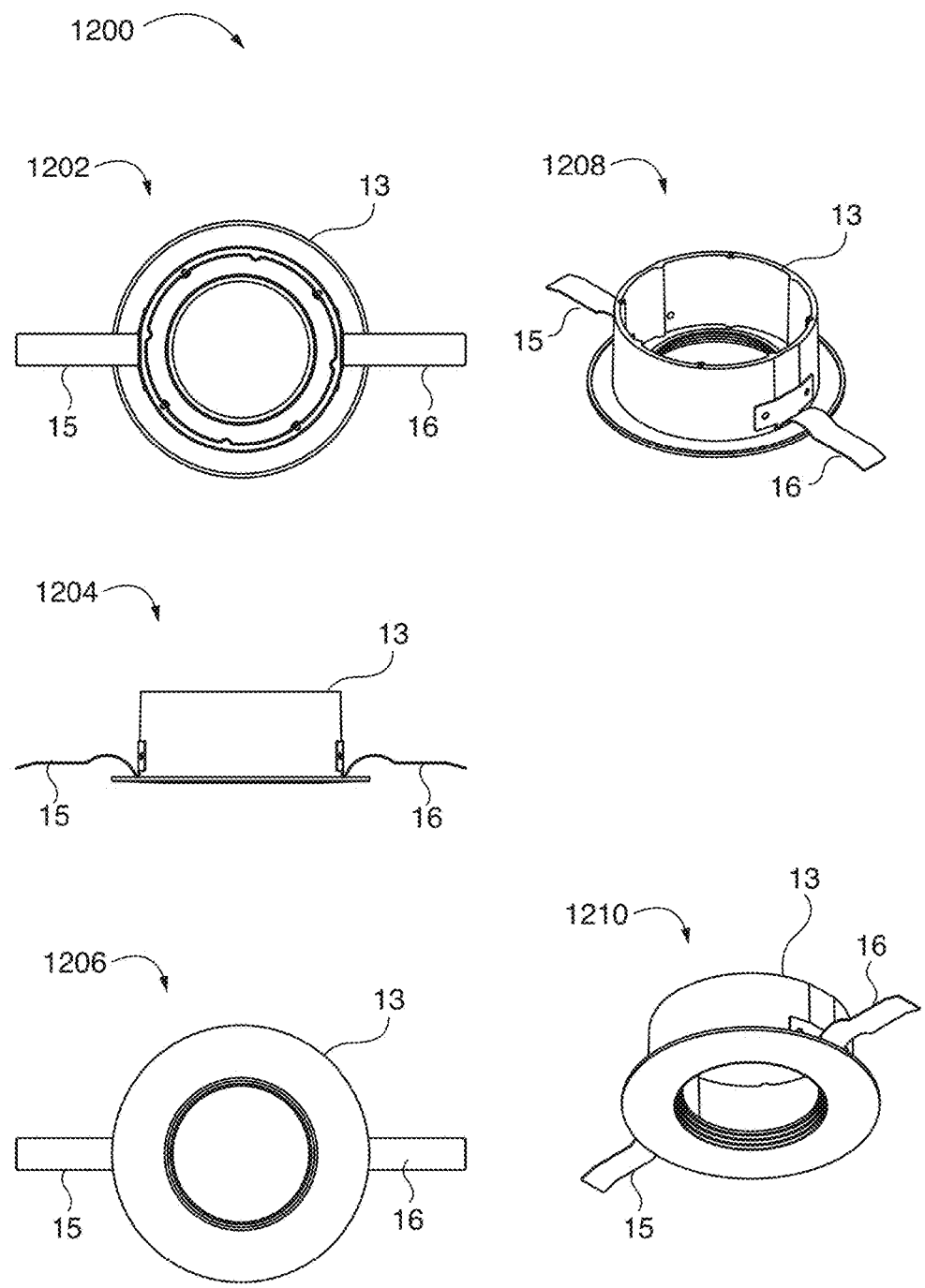
FIG. 12 is a drawing illustrating various views of the trim/heatsink 13 of FIG. 3 shown from a number of different perspectives.

Diagram 1200 of FIG. 12 is a drawing illustrating the trim/heatsink 13 with retaining tabs 15 and 16 of FIG. 3 shown from a number of different perspectives. Perspective view 1202 illustrates the trim/heatsink 13 as viewed from a first perspective. Perspective view 1204 illustrates the trim/heatsink 13 as viewed from a second perspective. Perspective view 1206 illustrates the trim/heatsink 13 as viewed from a third perspective. Perspective view 1208 illustrates the trim/heatsink 13 as viewed from a fourth perspective. Perspective view 1210 illustrates the trim/heatsink 13 as viewed from a fifth perspective.

Figure 13:
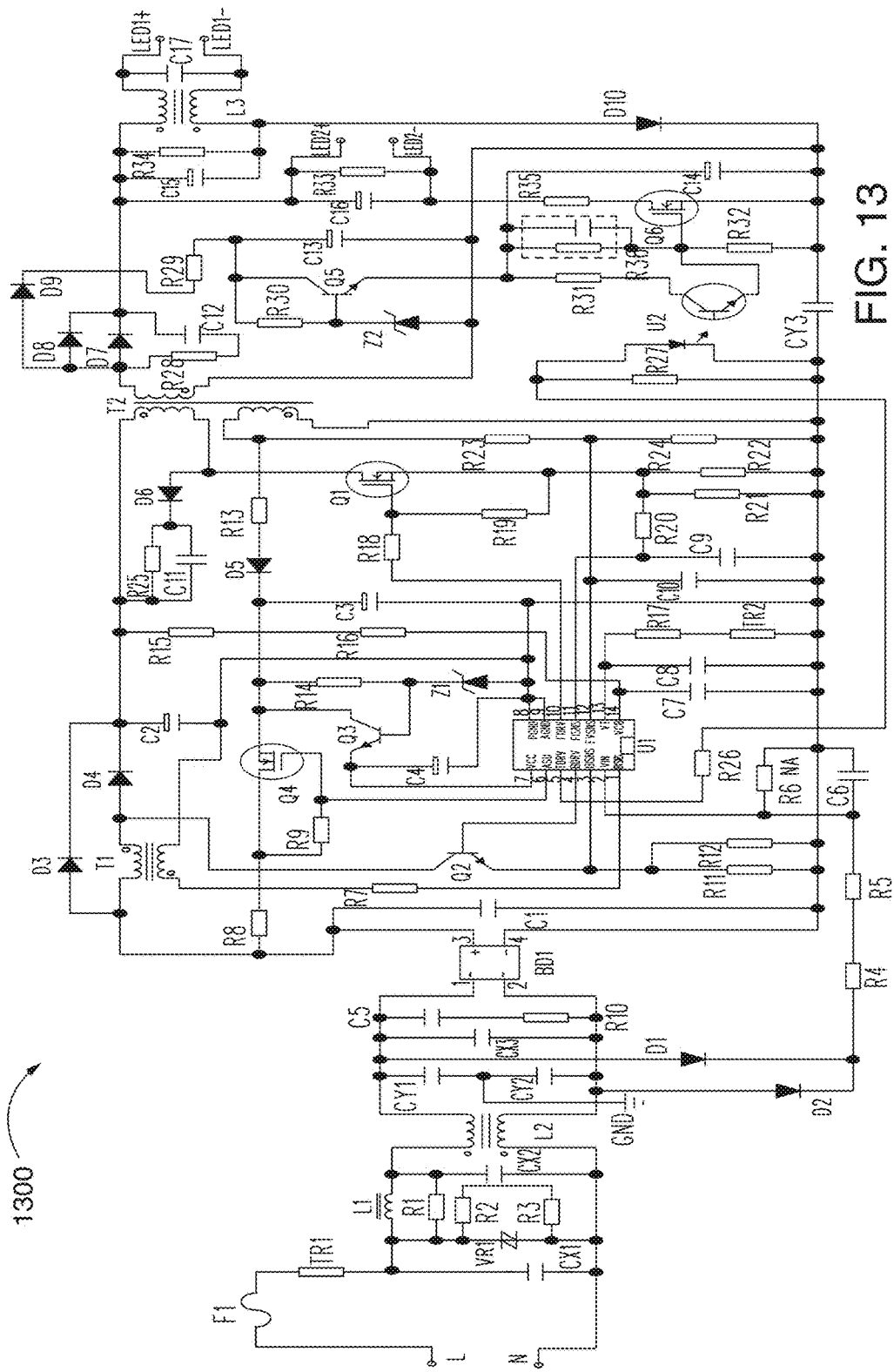
FIG. 13 is a drawing illustrating a circuit diagram of an exemplary embodiment of an LED light fixture circuit used in duo downlight LED lighting assembly of FIG. 1.

FIG. 13 is a drawing illustrating a circuit diagram 1300 of an exemplary embodiment of an LED light fixture circuit used with the duo downlight LED lighting assembly 102 of FIGS. 1 and 2. Wires which are not shown are used to electrically connect the electrical circuit 1300 to the primary LED light source 2 and the secondary LED light source 12. Wires connect the LED 1+ and LED 1− terminals/contacts shown on electrical circuit 1300 to the plus and minus terminals/contacts shown on the primary LED light source 2 of the light assembly 102. The electrical circuit 1300 is electrically connected from the LED 2+ and LED 2− terminals/contacts shown on the electrical circuit 1300 with wires to the secondary LED light source 12 of the light assembly 102. A power source is connected to the L and N terminals of the electrical circuit 1300.

FIG. 13A illustrates a table 1300A including values for the components illustrated in the circuit 1300 of FIG. 13 and LED downlight lighting assembly 102. The components are identified in FIG. 13 using the designators listed in table 1300A to facilitate matching of the components shown in FIG. 13 to the elements listed in table 1300A.

The operation of the exemplary duo dual LED downlight lighting assembly 102 of FIGS. 1 and 3 will now be explained. The exemplary duo dual LED downlight lighting assembly 102 of FIGS. 1 and 3 can change correlated color temperature (CCT), light output and light distribution all at the same or approximately the same time with one dimmer. The technology uses two sets of LEDs (primary LED light source 2 and secondary LED light source 12) and a driver (electrical circuit 1300) that controls crossfading between the primary and secondary LED light sources. When the lighting assembly is 100% on the dimming circuit, the light output, the CCT and the light distribution of the light assembly 102 is dictated by the primary LED light source 2 and primary reflector 3 which is in the center of the light assembly. As the light assembly 102 is being dimmed down, the secondary set of LEDs (LEDs 1001 of secondary LED light source 12), reflector 10 and diffuser 11 system starts crossfading between the primary set of LEDs. This is done by the double channel driver electric circuit 1300 illustrated in FIG. 13.

The lighting assembly 102 has three dynamic metrics: (1) dimming, (2) correlated color temperature (CCT) change, and (3) light distribution.

Dimming: The first set of LEDs (LED light source 2) is higher in light output and the second set of LEDs (LED light source 12) is lower. As you dim the light, the first LED light source 2 starts dimming down. The second set of LEDs (LED light source 12) kicks in midway and starts dimming up and finally down to 5% or approximately 5%.

CCT change: The first set of LEDs (primary LED light source 2) has a higher color temperature than the second set of LEDs (secondary LED light source 12). The second set of LEDs (secondary LED light source 2) is lower in color temperature than first set of LEDs (primary LED light source 2). As the primary and secondary LED sets start crossfading, the color creates a mixing chamber and defines a new hybrid CCT. This CCT change is from the highest CCT from the first set LEDs (primary LED light source 2) to the lowest CCT from the second set LEDs (secondary LED light source 12). The CCT change covers all the values in between.

Light Distribution: The first set of LEDs (primary LED light source 2) is higher in center beam intensity than the second set of LEDs (secondary LED light source 12). The second set of LEDs (secondary LED light source 12) is lower in center beam intensity than the first set of LEDs (primary LED light source 2). The light beam shaping element 3 which is a reflector in the exemplary light assembly 102 for the first set of LEDs (primary LED light source 2) creates a 25 degree or approximately 25 degree downlight spot beam with a high intensity. As the light assembly 102 dims down the light re-direction element 10 which in the exemplary embodiment 102 is a second reflector system of the second set of LEDs (secondary LED light source 12) starts to fade in. In the exemplary embodiment 102, the second reflector 10 is an uplight ambient reflector that has a 120 degree light distribution. As the light assembly 102 dims from 100% down to 5%, the light distribution changes from 25 degrees or approximately 25 degrees to 120 degrees or approximately 120 degrees. The 25 degree downlight light distribution and 120 degree light distribution discussed are only exemplary and the invention is applicable to other downlight light distributions.

Figure 14:
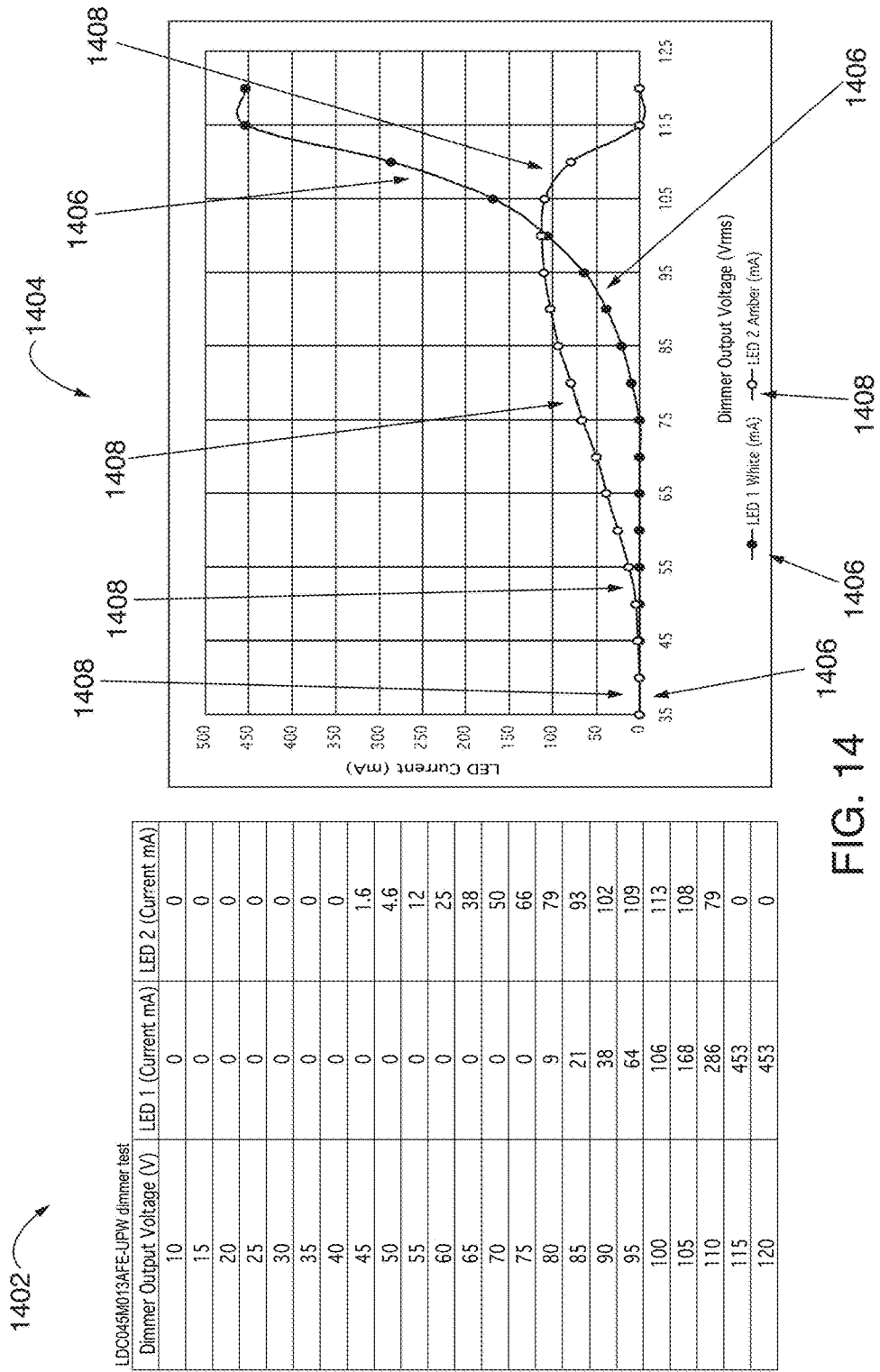
FIG. 14 is a diagram illustrating a table and graph or chart which shows the relationship between the dimmer output voltage and the current supplied to the primary and secondary LED light sources in an exemplary embodiment of the duo downlight LED lighting assembly of FIG. 1.

FIG. 14 includes a table 1402 and graph or chart 1404. The table 1402 shows the relationship between the dimmer output voltage and the current supplied to the primary and secondary LED light sources. Each row of the table 1402 shows the relationship between a dimming output voltage shown in volts (V) versus the corresponding current supplied to the primary LED light source 2 (LED 1) and the current supplied to the second LED light source 12 (LED 2). The dimmer output voltage is shown volts (V) while the current is shown in milliamps (mA). The graph or chart plots the LED current in mA on the Y axis versus the dimmer output voltage (Vrms) on X axis. The curve 1406 show the current for white light LED 1 in milliamps vs dimmer output voltage rms. The curve 1408 shows the current for amber light LED 2 in milliamps vs dimmer output voltage rms.

Figure 15A:
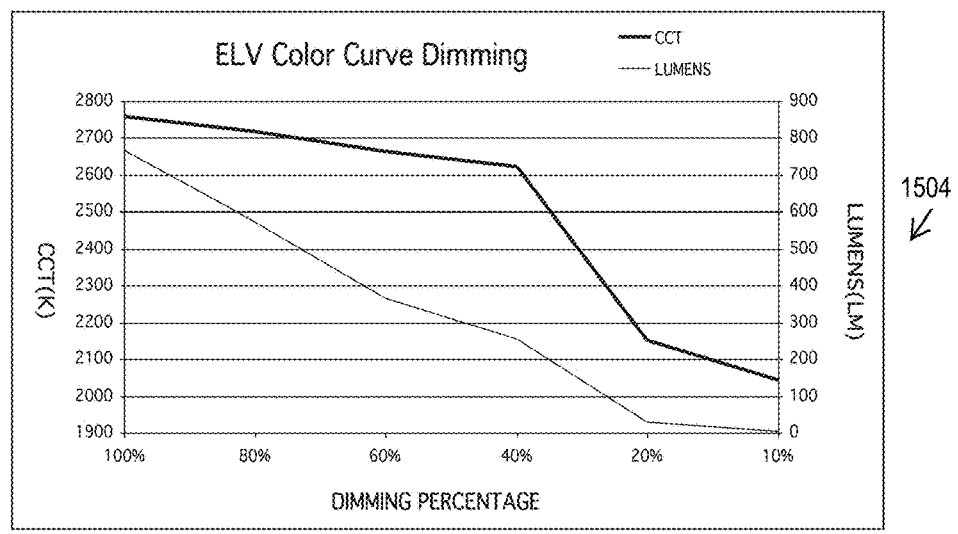
FIG. 15A illustrates via tables and ELV (Electronic Low Voltage) Color Curve Dimming plots the relationship between dimming levels, dimming, lumens, wattage, Lm/W, CCT (correlated color temperature, Ra (color rendering index), SDCM (Standard Deviation Color Match), Beam angles for an embodiment referred to as HR3D-RO92722S-WT model.
Figure 15B:
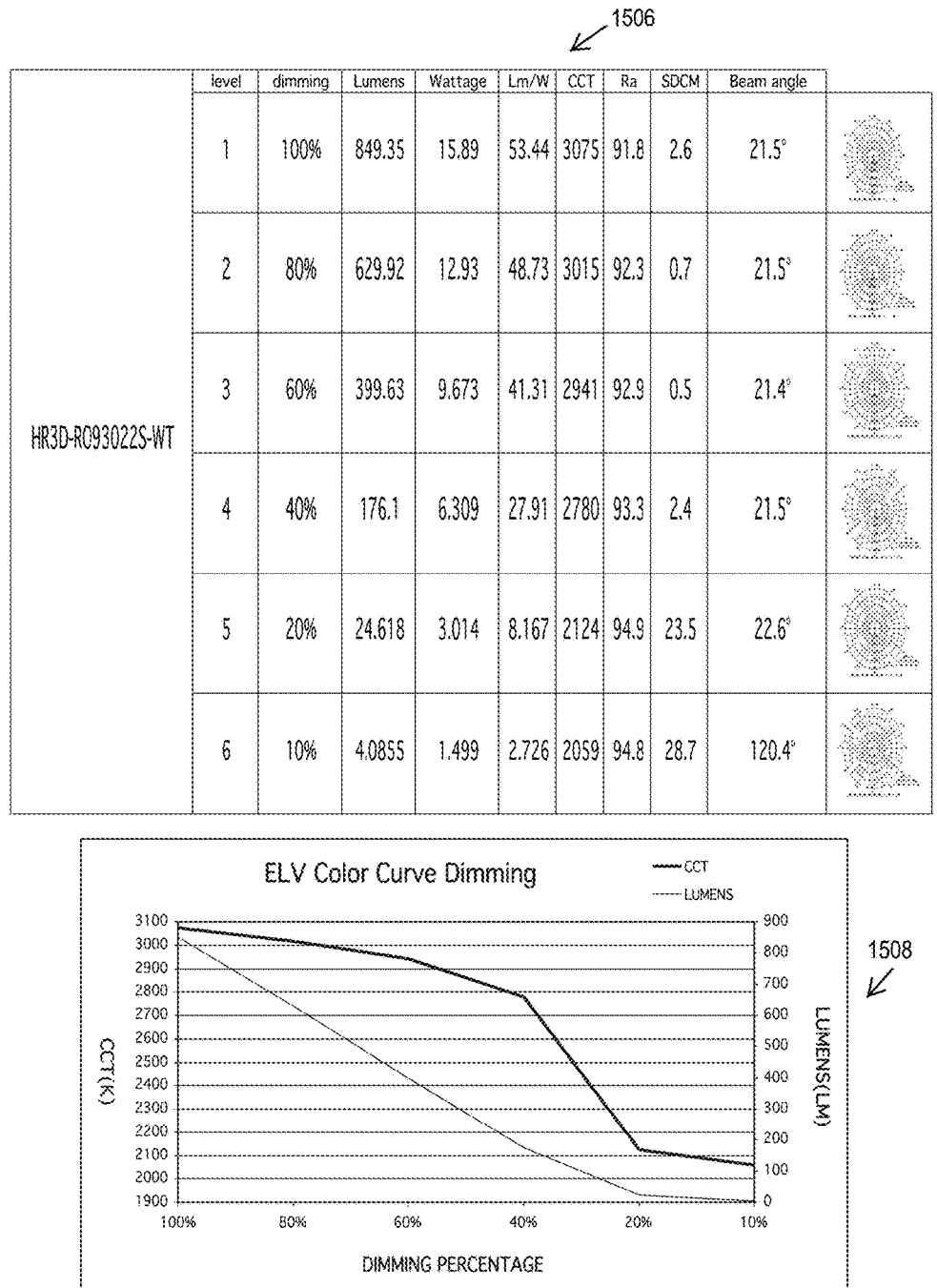
FIG. 15B illustrates via tables and ELV (Electronic Low Voltage) Color Curve Dimming plots the relationship between dimming levels, dimming, lumens, wattage, Lm/W, CCT (correlated color temperature, Ra (color rendering index), SDCM (Standard Deviation Color Match), Beam angles for an embodiment referred to as a HR3D-RO92722S-WT model. A light distribution plot is also provided.

FIG. 15A and FIG. 15B illustrate via tables 1502 and 1506 and ELV (Electronic Low Voltage) Color Curve Dimming plots 1504 and 1508 the relationship between dimming levels, dimming, lumens, wattage, Lm/W, CCT (correlated color temperature, Ra (color rendering index), SDCM (Standard Deviation Color Match), Beam angles for a first embodiment referred to as HR3D-RO92722S-WT model and a second embodiment referred to as HR3D-RO93022S-WT model. A light distribution plot is also provided with the chart 1506. As illustrated in the tables 1502 and 1506 and the plots 1504 and 1508 the HR3D-RO92722S-WT embodiment and HR3D-RO093022S-WT embodiment provide different warm dimming CCT ranges.

In some embodiments, the light assemblies are supplied with 120 VAC and have a power consumption of 15W. In some embodiments, the light assemblies work over a universal input range (120V-220V-277V). The light assemblies in some embodiments are made from a durable die-cast aluminum construction. In some embodiments, the ELV Dimming Lutron Maestro MAELV-600 is used.

In some embodiments, the duo dual source LED downlight lighting assembly has a 52 degree cut-off angle. In some embodiments the duo dual source LED downlight assembly uses ELV dimming circuits. The duo dual source LED downlight lighting assembly in some embodiments reduces overhead glare in the aperture with a warm dimming mixing chamber. In some embodiments, the duo dual source LED downlight lighting assembly uses a 3 inch aperture. In some embodiments the duo dual source LED downlight lighting assembly provides warm dimming CCT range from 2700K or approximately 2700K to 2200K or approximately 2200K. In some embodiments, the duo dual source LED downlight lighting assembly provides warm dimming CCT range from 3000K to 2200k or approximately 3000K to approximately 2200K. In some embodiments the duo dual source LED downlight lighting assembly provides a light output of up to 890 lumens or approximately 890 lumens and a beam spread of 20 degrees with a CRI (color rendering index) of 90+.

Various exemplary embodiments will different features will now be discussed. One exemplary embodiment of the present invention includes a light assembly comprising: a first reflector; an LED downlight for emitting light in a downward direction through a cavity formed by said first reflector; an LED uplight for emitting light in an upward direction, said first reflector being positioned above said LED uplight.

In some embodiments, the light assembly further comprises: a second reflector positioned below said first reflector, said second reflector having a larger diameter than said first reflector.

In some embodiments, the LED up light of the light assembly is a ring shaped assembly positioned inside a bottom portion of said second reflector.

In some embodiments, the light assembly further comprises: a diffuser ring position above said LED up light for diffusing light emitted from said LED up light as it travels up towards reflective surfaces of said first and second reflectors.

In some embodiments, the LED down light and the LED up light of the light assembly have different light output characteristics.

In some embodiments, the light output characteristics of the light assembly include color temperature and the down light outputs light in a first color temperature range and the LED up light outputs light in a second color temperature range.

In some embodiments of the light assembly, both the up light and down light output white light but with different color temperatures, the light from the down light and the light of the up light mixing in a mixture chamber formed by said first and second reflectors, said mixing producing a light output with a user controllable color temperature.

In some embodiments, the light assembly further comprises: a control circuit for controlling light output of the LED down light and light output of the LED up light as a function of a dimmer setting.

In some embodiments, the control circuit of the light assembly controls the color of the light output by said light assembly by controlling the amount of light output by the LED down light to the amount of light output by the LED up light based on the dimmer setting.

In some embodiments, the first reflector of the light assembly concentrates light over a smaller area than said second reflector.

In some embodiments, the control circuit of the light assembly controls said light assembly to act as a spot light with just the LED down light active at a first dimmer control setting and controls said light assembly to a wide angle light when said dimmer control is set to a second dimmer control setting.

In some embodiments of the light assembly, the light assembly has a controllable light output which covers a range of angles depending on the dimmer control setting.

In some embodiments of the light assembly the light assembly has a controllable light output which covers a range of angles from at least 21.5 degrees to at least 120 degrees depending on the dimmer control setting.

In some embodiments, the first reflector of the light assembly has a mirror finish and said second reflector has a matte finish.

In some embodiments, the LED downlight of the light assembly is located at the top of said first reflector and the LED uplight of the light assembly is located at the bottom of said second reflector.

In some embodiments, the light assembly further comprises: a lens, sealing a bottom portion of said first reflector and separating said first reflector from said second reflector.

In some embodiments, the light assembly further comprises: a trim ring assembly with retaining tabs, said trim ring assembly including a shoulder portion for insertion into a bottom portion of said second reflector and a flange portion for sealing the bottom portion of said second reflector with respect to a mounting surface into which said light assembly can be inserted.

In some embodiments, the mounting surface is a sheet rock ceiling of a room.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:
1. A light assembly comprising:
   a first reflector having a mirror finish and having a top and a bottom;

an LED downlight for emitting light in a downward direction through a cavity formed by said first reflector, said LED downlight being located at the top of said first reflector;

an LED uplight for emitting light in an upward direction, said first reflector being positioned above said LED uplight;

a second reflector having a matte finish and having a top and a bottom, said second reflector being positioned below said first reflector, said second reflector having a larger diameter than said first reflector, said LED uplight being located at the bottom of said second reflector;

a seal located between a bottom surface of the first reflector and a top surface of the second reflector that prevents light leakage, said second reflector having a concave shape including a top opening through which light passes and a bottom opening through which light passes;

a lens, sealing a bottom portion of said first reflector and separating said first reflector from said second reflector; and a trim ring assembly with retaining tabs, said trim ring assembly including a shoulder portion for insertion into a bottom portion of said second reflector and a flange portion for sealing a bottom portion of said second reflector with respect to a mounting surface into which said light assembly can be inserted.

2. The light assembly of claim 1, wherein said LED uplight is a ring shaped assembly positioned inside said bottom portion of said second reflector.

3. The light assembly of claim 2, further comprising:
a diffuser ring positioned above said LED uplight for diffusing light emitted from said LED uplight as it travels up towards reflective surfaces of said first and second reflectors.

4. The light assembly of claim 1, wherein said LED downlight and said LED uplight have different light output characteristics.

5. The light assembly of claim 4, wherein said light output characteristics include color temperature and wherein said LED downlight outputs light in a first color temperature range and the LED uplight outputs light in a second color temperature range.

6. The light assembly of claim 5, wherein both said LED uplight and LED downlight output white light but with different color temperatures, the light from the LED downlight and the light of the LED uplight mixing in a mixture chamber formed by said first and second reflectors, said mixing producing a light output with a user controllable color temperature.

7. The light assembly of claim 5, further comprising:
a control circuit for controlling light output of the LED downlight and light output of the LED uplight as a function of a dimmer setting.

8. The light assembly of claim 7, wherein said control circuit controls the color of the light output by said light assembly by controlling the amount of light output by the LED downlight to the amount of light output by the LED uplight based on the dimmer setting.

9. The light assembly of claim 7, wherein said first reflector concentrates light over a smaller area than said second reflector.

10. The light assembly of claim 9, wherein said control circuit controls said light assembly to act as a spotlight with just the LED downlight active at a first dimmer control setting and controls said light assembly to act as a wide angle light when said dimmer control is set to a second dimmer control setting.

11. The light assembly of claim 10, wherein said light assembly has a controllable light output which covers a range of angles depending on the dimmer control setting.

12. The light assembly of claim 10, wherein the light assembly has a controllable light output which covers a range of angles from at least 21.5 degrees to at least 120 degrees depending on the dimmer control setting.

13. The light assembly of claim 1, wherein said mounting surface is a sheet rock ceiling of a room.

* * * * *